(12) United States Patent
Kuehne

(10) Patent No.: US 8,087,361 B2
(45) Date of Patent: Jan. 3, 2012

(54) DEVICE, PARTICULARLY FOR SAFETY BRAKING OF VEHICLES ON RAILS

(75) Inventor: Joerg Kuehne, Tiefenbrünn (DE)

(73) Assignee: MAHA Maschinenbau Haldenwang GmbH & Co. KG, Haldenwang (DE)

( * ) Notice: Subject to any disclaimer, the term of this patent is extended or adjusted under 35 U.S.C. 154(b) by 0 days.

(21) Appl. No.: 12/738,564

(22) PCT Filed: Oct. 15, 2008

(86) PCT No.: PCT/DE2008/001688
§ 371 (c)(1),
(2), (4) Date: Aug. 30, 2010

(87) PCT Pub. No.: WO2009/049606
PCT Pub. Date: Apr. 23, 2009

(65) Prior Publication Data
US 2010/0319566 A1 Dec. 23, 2010

(30) Foreign Application Priority Data
Oct. 19, 2007 (DE) .......... 10 2007 050 147

(51) Int. Cl.
*B61K 7/00* (2006.01)
(52) U.S. Cl. ......... 104/249; 104/242; 104/250; 104/251
(58) Field of Classification Search .......... 104/249–252, 104/254, 259, 260
See application file for complete search history.

(56) References Cited

U.S. PATENT DOCUMENTS

| | | | | |
|---|---|---|---|---|
| 1,936,107 A | * | 11/1933 | Cunneen | 187/217 |
| 2,053,368 A | * | 9/1936 | Hott | 187/217 |
| 3,252,544 A | * | 5/1966 | Lill | 254/88 |
| 4,501,342 A | * | 2/1985 | Murphy | 187/216 |
| 7,891,577 B2 | * | 2/2011 | Seki et al. | 238/18 |
| 2006/0124024 A1 | * | 6/2006 | Hachikawa | 104/242 |
| 2007/0199475 A1 | * | 8/2007 | Rastegar et al. | 104/249 |
| 2010/0083865 A1 | * | 4/2010 | Heyden et al. | 104/249 |
| 2010/0319566 A1 | * | 12/2010 | Kuehne | 104/242 |

FOREIGN PATENT DOCUMENTS
GB 712397 7/1954
GB 1 274 215 5/1972

OTHER PUBLICATIONS

PCT/DE2008/001688, International Search Report, mail date Feb. 10, 2009.

* cited by examiner

*Primary Examiner* — Joe Morano, IV
*Assistant Examiner* — Jason C Smith
(74) *Attorney, Agent, or Firm* — Blakely Sokoloff Taylor & Zafman LLP

(57) ABSTRACT

The invention relates to a device, particularly for safety braking of vehicles on rails having at least one flap unit (1) connected in a rotatable fashion to a rail, wherein the flap unit (1) may be moved into a locking position and a release position by rotation about a rotational axis (D), wherein, in a locking position, the balance point $SP_K$ of the flap unit (1) is located above a horizontal plane (E) in which the rotational axis (D) is located.

13 Claims, 4 Drawing Sheets

DEVICE, PARTICULARLY FOR SAFETY BRAKING OF VEHICLES ON RAILS

CROSS-REFERENCE TO RELATED APPLICATIONS

This application is the U.S. National Stage entry under 35 U.S.C. §371 of international application PCT/DE2008/001688, filed 15 Oct. 2008, which claims priority to German patent application DE 10 2007 050 147.3, filed 19 Oct. 2007. Both applications are hereby incorporated by reference in their entirety.

The present invention relates to a device, particularly for roll-off protection of vehicles against rolling off a rail, with which an automatic transfer of the device into a locking position can be implemented.

The prior art discloses rails that are used on lifting platforms with which vehicles, such as motorcars, are taken to an elevated position in order to be able to perform maintenance and repair work on the vehicles. To this end, the elevated vehicles are secured against rolling off by applying the parking brake mounted on the vehicle. However, with this kind of safeguarding, the human factor plays an error-prone role not to be neglected so that if the application of the parking brake is forgotten the vehicle may be set into motion, for example due to repair work, a shift of the balance point or an oblique position of the rail, and the danger of the vehicle rolling off the rail is at hand. As a consequence, the risk is considerable damage to the vehicle or the rail as well as injuries to persons.

The devices known from practice which are located in the roll-on and roll-off areas of rails have a pantograph or scissor mechanism which makes it possible to extend the protection device if the rail of the lifting platform is in an elevated state. In a lowered state, the protection device is retracted to allow unimpeded driving onto and off the rail. However, such protection devices have the disadvantage that due to external influences such as dirt, rust or wear the kinematics of the scissor mechanism is affected and thus it is no longer possible to extend or retract the roll-off protection.

As an alternative thereto, the prior art discloses lifting platforms where ramps are mounted to the rails thereof. These ramps are supported to be rotatable and have a long entry range as an extension of the rail in order to equalize differences in height between a rail and a floor surface, and a short subarea overlapping with the rail. After a vehicle has moved onto the rail, the lifting platform is elevated, the ramps tilting such that the shorter areas overlapping the rail rise and thus form a roll-off impediment for the vehicle. However, such protection devices show disadvantages in that the long overhangs of the ramps in the elevated state are freely suspended into the workshop space and present a considerable risk of injury for the working staff due to the length and the frequently sharp-edged quality thereof.

In contrast thereto, it is an object of the invention to further develop a device of the above-described kind such that an automatic roll-off protection is provided while at the same time the risk of injury to workers is reduced and the ability to retrofit to a plurality of different rails is guaranteed.

This object is achieved by a device having the features of the independent claim.

Advantageous developments and preferred embodiments of the invention are stated in the subclaims.

In order to achieve this object, the invention teaches that the device may comprise at least one flap unit which may be connected in a rotatable fashion to a rail, wherein the flap unit may be moved into a locking position and/or a release position by rotation about a rotational axis, and the device may be characterized in that in a locking position, the balance point of the flap unit is above a horizontal plane in which the rotational axis may be located.

Furthermore, an additional element may be provided that is connected to the flap unit such that in a locking position the balance point of the entirety consisting of flap unit and additional element may be below the horizontal plane in which the rotational axis may be located.

In doing so, it is possible to ensure in a particularly simple manner that the flap unit of the device may be automatically transferred to a locking position due to the influence of weight. Furthermore, advantages arise in that additional drives, such as servomotors, hydraulic cylinders or the like, are omitted and thus the number of components of the overall device is reduced.

Furthermore, the device may include a rotational movement generation unit.

Moreover the rotational movement generation unit may be a power element that may be connected to the flap unit such that a torque about the rotational axis can be generated so that in a locking position the balance point of the flap unit may be above a horizontal plane in which the rotational axis may be located. The power element may be a torsional spring, a compression spring, a hydraulic cylinder and/or a pneumatic cylinder.

From this, advantages result insofar as the locking effect of the device is increased by the rotational movement generation unit and a considerable improvement of the protection device is generated. Another advantage lies in the fact that independently of the position of the balance point of the flap unit and thus independently of the weight the device can be moved into a locking position.

Furthermore, at least one stop element may be provided at the flap unit, the connecting element and/or the support of the device.

With these, it is possible in a particularly simple manner to determine the predetermined positions of the flap unit in the locking position and the release position by the stop element coming into contact, for example, with the rail and/or the flap unit, depending on the mounting site.

Moreover, the flap unit may be connected to at least one bearing and guiding element. In this case, the bearing and guiding element may be made of plastic material. Furthermore, the bearing and guiding element may be formed as a wheel or a roll and disposed on the device so as to be rotatable.

This offers the advantage that, if the device is moved into the release position from the locking position, contact is first made via the bearing and guiding element through coming into contact with a floor surface, for example, a workshop, wherein abrasions on the workshop floor and on the flap unit are prevented. Further advantages result from the exchangeability of the bearing and guiding element upon reaching a wear limit because this prolongs the service life of the flap unit.

Furthermore, the flap unit may be connected such to the rail that the rotational axis divides the flap unit into a short subarea and a long subarea, and/or the bearing and guiding element and/or the additional element may be located in the short subarea.

Thus, it can be ensured that the risk of injury to a worker or operator at the protection device is minimal due to short overhangs.

Furthermore, the additional element may be made of a high density material such as, for example, steel, lead or concrete, and may be disposed at the flap unit and/or inside a support, wherein the support may be connected to the flap unit.

On the one hand, this results in the advantage that due to the high density of the material it is possible to achieve a high weight which thus improves the unfolding effect and accelerates the extending of the flap unit. On the other hand, the advantage results in that the additional element may be disposed in or on the support so as to save space.

Moreover, the flap unit may be formed of a grid plate, a perforated plate and/or a plate, the flap unit consisting of organic material, inorganic material and/or plastic material.

Furthermore, the device may be characterized in that it can be retrofitted to existing rails.

In summary, the advantages of the invention shall be listed below. By selecting the position of the balance point $SP_G$ it is possible to implement an automatic extending of the device in a particularly simple manner without the need of an additional drive therefore. Due to the simple structure by means of a single rotatory degree of freedom, the use of a complex kinematics can be omitted while malfunctions due to failures of this kinematics are prevented. Due to short overhangs, it is possible to minimize the required space while at the same time the risk of injury to the working staff is reduced. Due to the simple assembly it is possible to guarantee the ability to retrofit to a plurality of different existing rails or platforms for a large variety of applications.

Below, the invention will be explained in more detail by means of drawings which merely show embodiments in a schematic, non-limiting view, wherein.

Figure 1:
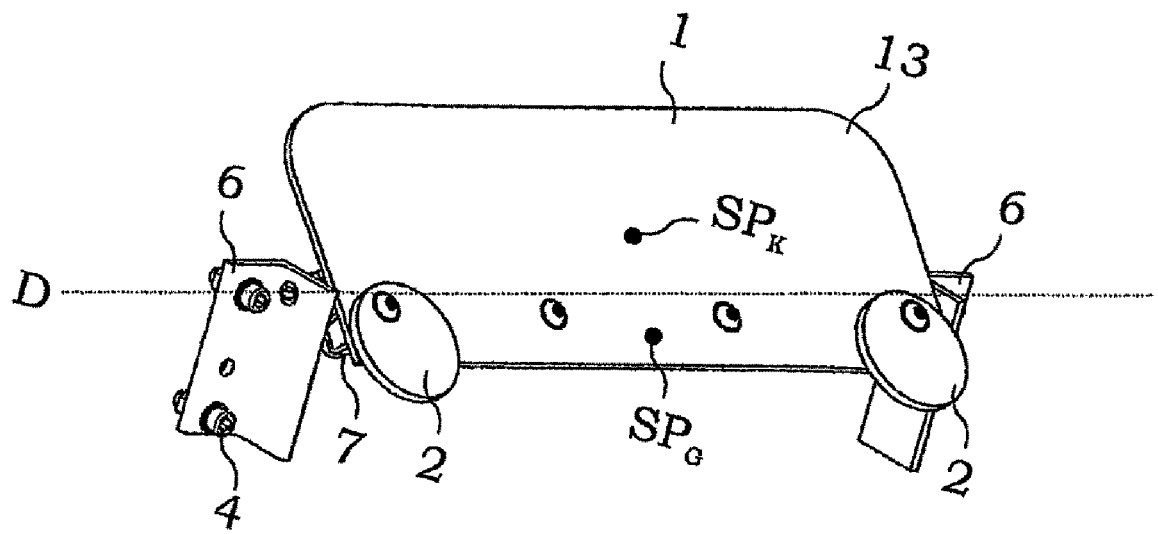
FIG. 1 shows a perspective view of the protection device.

The embodiment of the device for the roll-off protection of vehicles from a rail shown in FIG. 1 has a flap unit 1 in the shape of a plate.

In an embodiment, not shown, the flap unit 1 may also be formed in the shape of a grid.

In the embodiment of FIG. 1, bearing and guiding elements 2 are mounted to the longitudinal edge portions of the flap unit 1. Here, the disc-shaped bearing and guiding elements 2 are eccentrically fixed to the flap unit 1 by using fixing elements or by welding or gluing, wherein at least a subarea of a circular surface of the bearing and guiding element 2 is in contact with a first surface 13 of the flap unit 1. The flap unit 1 has a second surface 14, see FIGS. 3A/3B, which runs parallel to the first surface 13. By means of this second surface 14, the flap unit 1 is in contact with a support 7, the flap unit 1 and the support 7 being connected by means of fixing elements or by a welding or gluing connection. The support 7 substantially runs parallel to a longitudinal direction of the flap unit 1 wherein a respective pivot includes a rotatory degree of freedom provided at both end portions thereof.

Each pivot is connected to the support 7 on the one hand and to a connecting element 6 on the other hand, so that a rotation of the connecting elements 6 about a rotational axis of the pivot becomes possible. Thereby, the flap unit 1, which is solidly connected to the support element 7, has a rotatory degree of freedom about the connecting elements 6.

The connecting elements 6 are two mirror-symmetrical components with which the device according to the invention can be mounted, e.g. to rails. Here, the connecting elements 6 are mirror-symmetrically disposed on the support 7 with respect to a plane to which the rotational axis D is perpendicular.

In the embodiment shown in FIG. 1, the connecting elements 6 are formed in the shape of L-shaped angle brackets, a bore for receiving the pivot being provided on one leg. Simultaneously, this bore determines the rotational axis D. On the other leg, the connecting element 6 has two further bores through which the connecting elements 6 can be mounted to a rail by means of fixing elements, such as, for example, screws or rivets.

Below, the mode of operation of the device will be explained in more detail with reference to FIGS. 2A and 2B.

Figure 2A:
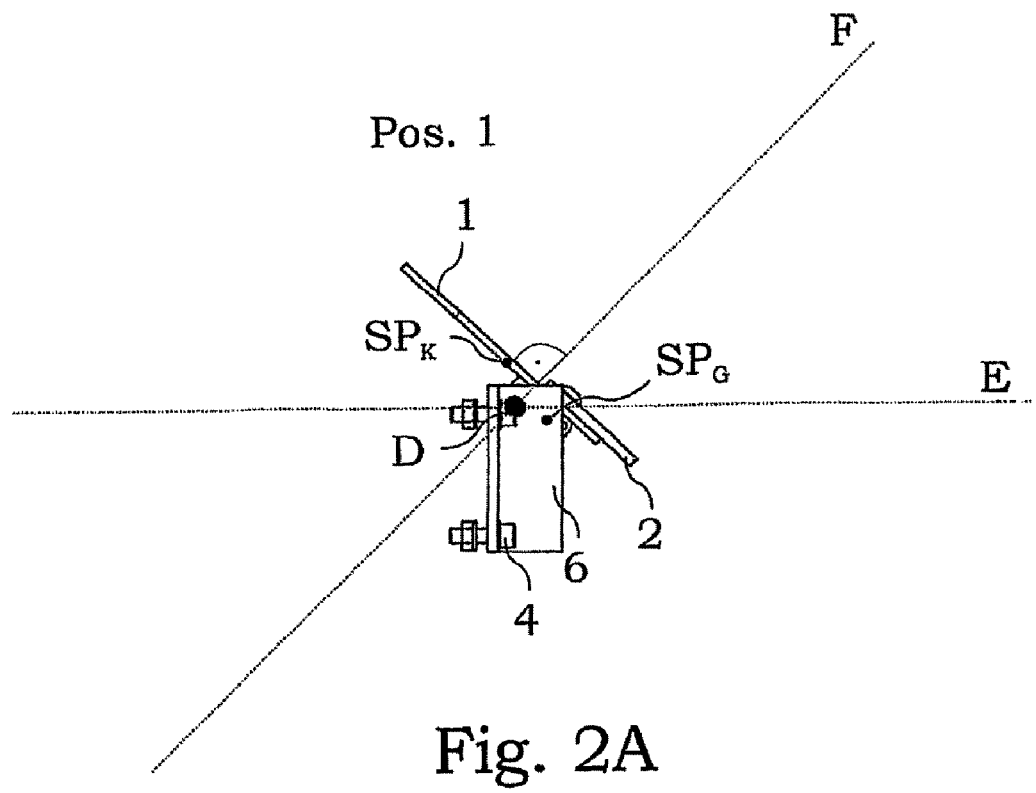
FIG. 2A shows a side view of the protection device in a locking position.
Figure 2B:
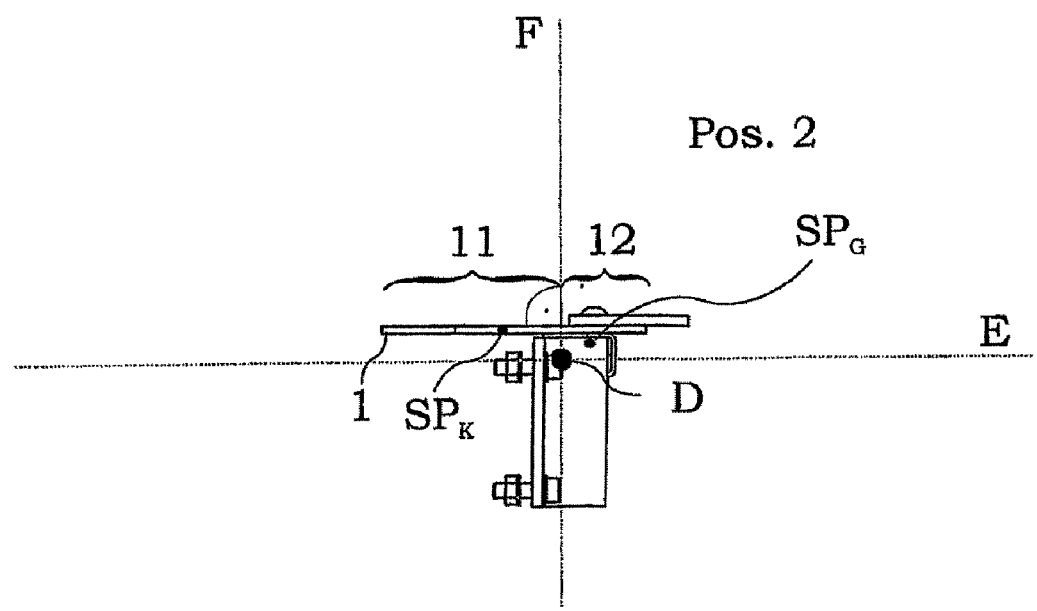
FIG. 2B shows a side view of the device in a release position.
Figure 4:
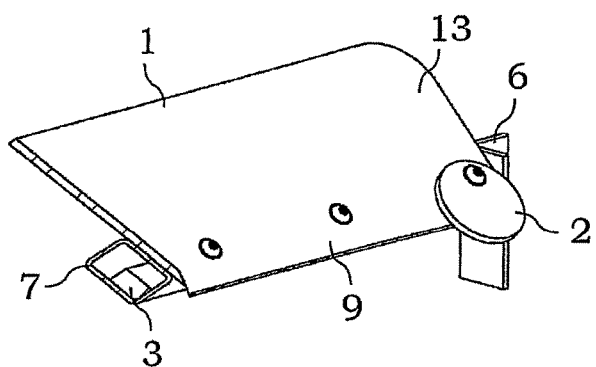
FIG. 4 shows a perspective cross-sectional view of the protection device.

FIG. 2A shows the embodiment of the device according to the invention in a locking position. Same reference numerals denote the same elements as in FIG. 1. The rotational axis D, which allows a rotational movement of the flap unit 1 about the connecting elements 6, is located in a horizontal plane E. The balance point $SP_k$ of the flap unit 1 is above this horizontal plane E. The balance point $SP_G$ of the entirety consisting of the flap unit 1 and an additional element 3, cf. FIG. 4, is below the plane E. At the same time, the rotational axis D runs through another plane F which is orthogonal to the first and the second surfaces of the flap unit 1. The plane F divides the flap unit 1 into a long subarea 11 and a short subarea 12, cf. FIG. 2B. An additional element 3 is disposed on the short subarea 12 as additional weight.

The weight G (not shown) acts on the overall balance point $SP_G$ and generates a torque about the rotational axis D so that a torque in the clockwise direction is generated which tends to move the short subarea 12 and the long subarea 11 into a vertical position with respect to the plane E.

Figure 3A:
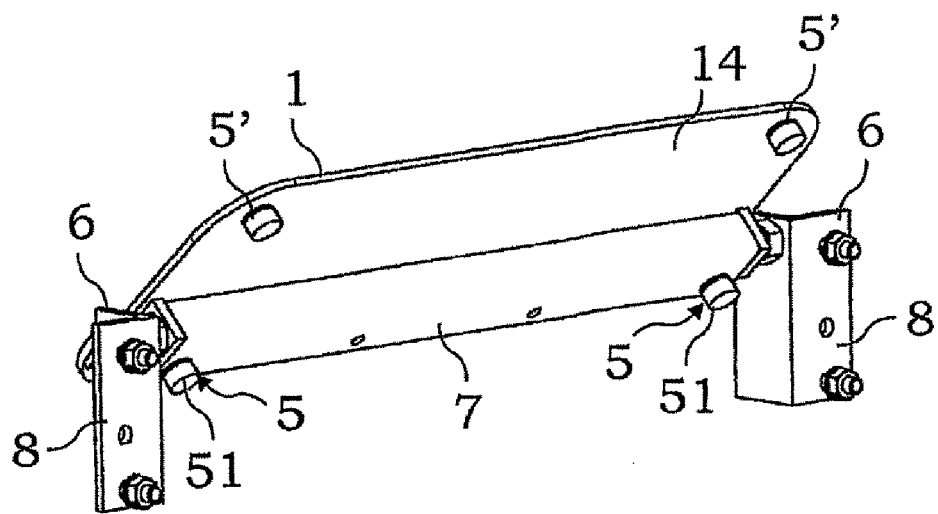
FIG. 3A shows a perspective view of the protection device.

By using stop elements 5, cf. FIGS. 3A/3B, the rotational movement of the flap unit 1 is stopped at a predetermined position so that the flap unit 1 remains in this locking position pos. 1. Here, the stop elements 5 selectively come into contact directly with a rail or with a counter stop element.

It can be taken from FIG. 2A that the bearing and guiding elements 2 are connected to the flap unit 1. If the rail moves downwards, the bearing and guiding elements 2 come into contact with a floor surface 15, cf. FIG. 5, which exerts a force on the bearing and guiding elements 2. This force generates a torque which counteracts the torque generated by the weight and thus moves the flap unit 1 into a release position pos. 2, as shown in FIG. 2B. In a locking release position pos. 2 the first and the second surfaces 13, 14 of the flap unit 1 are essentially parallel to the plane E.

FIG. 3A shows another perspective view of an embodiment of the device according to the invention. Respective surfaces 8 are provided at the connecting elements 6, which surfaces are brought into contact with the rail during assembly of the device. Using the fixing elements 4, the connecting elements 6 are mounted to the rail whereby the flap unit 1 is fixed with respect to the rail such that it only has one rotatory degree of freedom about the rotational axis D.

Furthermore, the support 7 is mounted to the flap unit 1, wherein stop elements 5 are provided in the longitudinal end portions thereof. These stop elements 5 have at least one contact surface 51 which is substantially vertical on a tangent of a circle through whose center the rotational axis D passes, the rotational axis D being vertical to the circle surface. As mentioned above, the stop elements 5 define a predetermined locking position pos. 1 of the flap unit in which vehicles located on the rail are kept safe from rolling off.

On the second surface 14 in the long subarea 11 of the flap unit 1, further stop elements 5' are disposed which come into contact with a rail if the flap unit 1 is located in the release position pos. 2. The stop elements 5' thus determine the position of the flap unit 1 in the release position pos. 2.

Figure 3B:
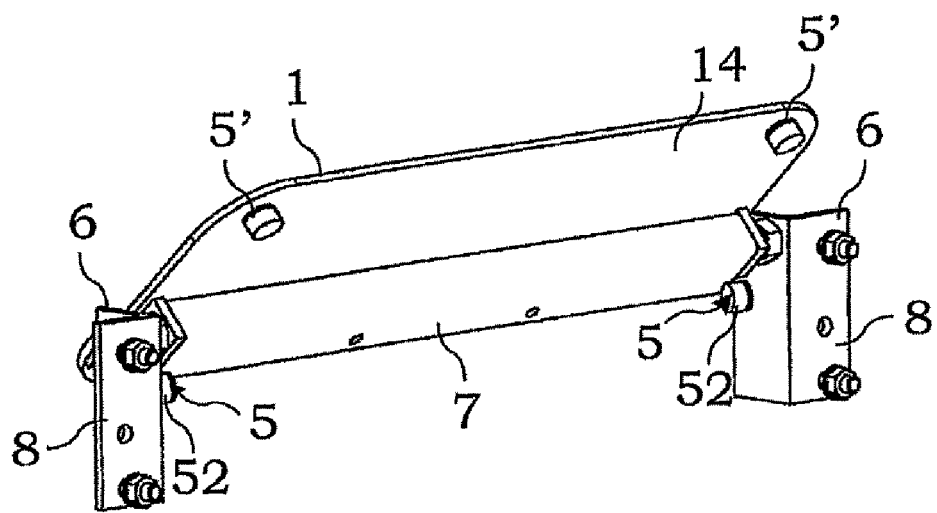
FIG. 3B shows another perspective view of the protection device with alternatively disposed stop elements.

FIG. 3B illustrates another embodiment of the device in which the stop elements 5 are disposed at the connecting elements 6. If the flap unit 1 is in a locking position, a lower surface of the support 7 comes into contact with an edge portion 52 of at least one stop element 5 and determines the locking position pos. 1 of the flap unit 1.

In this case, the stop elements 5 may be formed so as to be variable so that different locking positions may be determined in advance, for example, in dependence of the wheel size and/or the weight of the vehicle to be secured.

In a further embodiment, not shown, the stop elements 5 may be screwed together with the support 7. On a thread by which the stop element 5 is screwed together with the support 7, there is provided at least one counter nut between the support 7 and the stop element 5, by means of which the vertical distance between a contact surface 51 of the stop element 5 to a surface of the support 7 can be adjusted by locking the nuts against a surface of the support 7.

As can be taken from FIGS. 1 and 3, the flap unit 1 and the bearing and guiding elements 2 have rounded edges in order to minimize to a large extent the risk of injury to persons.

FIG. 4 shows a perspective cross-sectional view of the another embodiment of the present invention. Same reference numerals as in FIGS. 1 to 3 denote same components. It can be taken from the cross-sectional view that the additional element 3 is directly disposed inside the support 7. The additional element 3 may be connected to the support 7 by a welding connection, adhesive connection or detachable connection.

In another embodiment, not shown, of the invention the additional element 3 may be in direct contact with the flap unit 1. Here, the additional element 3 may be mounted between the support 7 and a lower longitudinal edge of the short subarea 12 of the flap unit 1.

In FIG. 4, the first surface 13 of the flap unit 1 has an oblique portion 9 in the short subarea 12 on the longitudinal side thereof. By providing the oblique portion 9, it is particularly easy to drive a vehicle onto the rail. In particular if the drive of the vehicle has a defect, the oblique part 9 proves to be advantageous because a vehicle can be pushed onto the rail manually without any high expenditure of force.

In a further embodiment, not shown, of the present invention, the additional element 3 may be formed integrally with the support 7, for example as a support 7 made of solid material. Such a support may be connected to the flap unit 1, with the rotational axis D running eccentrically through the support 7. Thus, it is possible to shift the balance point $SP_G$ further below the plane E in a particularly easy manner. In this case, the support may have a round, oval or at least triangular or polygonal cross-section and may be formed in a prismatic shape.

In a further embodiment, not shown, of the present invention, a rotary movement generating means, for example, a torsional and/or pressure spring, a hydraulic cylinder, a pneumatic cylinder and/or electric servomotor may be provided instead of the additional element 3. The rotary movement generating means generates a torque which tends to move the flap unit 1 into a locking position corresponding to the above-described locking position if the bearing and guiding element 2 is not in contact with a floor surface 15. Preferably, a pressure spring is used as a rotational movement generation unit which on the one hand is connected to the flap unit 1 and on the other hand to the rail or the connecting elements 6.

A person skilled in the art can take from the above description of the invention that the inventive device can also be retrofitted to a plurality of different rails due to the connecting elements 6. In addition thereto, such a protection device may also be mounted to rails or platform lifts as are used, for example, in duplex garages, tow cars, truck trailers for transporting vehicles or railway carriages for transporting vehicles.

Figure 5:
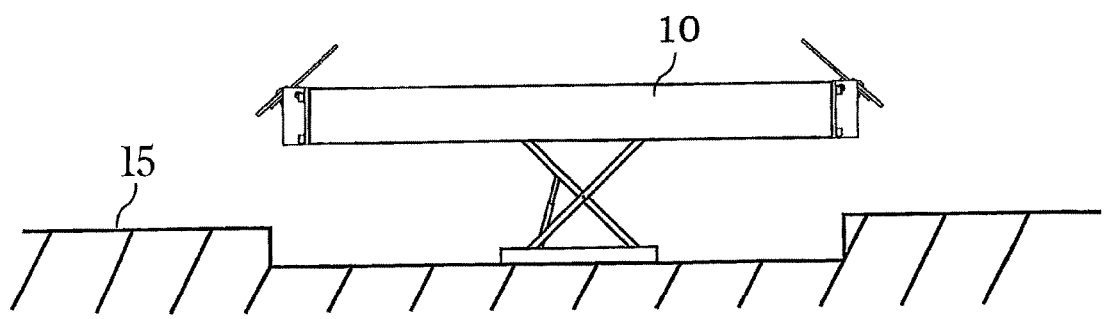
FIG. 5 shows a perspective view of a lifting platform including protection devices disposed on the rails thereof.

In an exemplary manner and not limiting, FIG. 5 shows the use of an embodiment of the device according to the invention on a vehicle lifting platform. In an elevated state, the flap unit 1 is in a locking position so that the vehicle is prevented from rolling off the rails. In a lowered state, not shown, of the lifting platform, the device is folded (pos. 2), the short subarea 12 covering clearances between the rail 10 and a hall floor 15, which makes it considerably easier to drive or push the vehicle onto the rail 10.

The invention claimed is:

1. A device for roll-off protection of vehicles on rails, the device comprising:
   at least one flap unit coupled in a rotatable fashion to a rail, wherein the flap unit can be moved into a locking position and a release position by rotation about a rotational axis;
   wherein in a locking position, the balance point of the flap unit is located above a horizontal plane in which the rotational axis is located; and
   an additional element coupled to the flap unit such that in the locking position the balance point of the entirety of the flap unit and the additional element is located below a horizontal plane in which the rotational axis is located.

2. The device of claim 1 wherein the flap unit is coupled to at least one bearing and guiding element.

3. The device of claim 1 wherein the additional element is made of a high density material.

4. The device of claim 1, further comprising a rotational movement generation unit coupled to the flap unit.

5. The device of claim 4 wherein the rotational movement generation unit is a power element coupled to the flap unit such that a torque about the rotational axis can be generated so that in the locking position the balance point of the flap unit is above a horizontal plane in which the rotational axis is located.

6. The device of claim 1 wherein at least one stop element is provided on the flap unit, a support element and/or a connecting element.

7. The device of claim 1 wherein the flap unit is coupled to at least one bearing and guiding element.

8. The device of claim 7 wherein the rotational axis divides the flap unit into a short sub-area and a long sub-area and the bearing and guiding element and/or an additional element is located in the short sub-area.

9. The device of claim 1 wherein the flap unit is formed of a grid plate, a perforated plate and/or a plate, the flap unit consisting of organic material, inorganic material and/or plastic material.

10. The device of claim 1 wherein the device can be retrofitted to existing rails.

11. A device for roll-off protection of vehicles on rails, the device comprising:
    at least one flap unit coupled in a rotatable fashion to a rail, wherein the flap unit can be moved into a locking position and a release position by rotation about a rotational axis, and wherein in a locking position, the balance point of the flap unit is above a horizontal plane in which the rotational axis is located;

an additional element coupled to the flap unit such that in a locking position the balance point of the entirety of the flap unit and the additional element is below a horizontal plane in which the rotational axis is located; and a rotational movement generation unit coupled to the flap unit.

12. The device of claim 11 wherein the rotational movement generation unit is a power element that is coupled to the flap unit such that a torque about the rotational axis can be generated so that in a locking position the balance point of the flap unit is above a horizontal plane in which the rotational axis is located.

13. A device for roll-off protection of vehicles on rails, the device comprising:

at least one flap unit coupled in a rotatable fashion to a rail, wherein the flap unit can be moved into a locking position and a release position by rotation about a rotational axis, and wherein in a locking position, the balance point of the flap unit is above a horizontal plane in which the rotational axis is located;

an additional element coupled to the flap unit such that in a locking position the balance point of the entirety of the flap unit and the additional element is below a horizontal plane in which the rotational axis is located; and a rotational movement generation unit, wherein the rotational movement generation unit is a power element coupled to the flap unit such that a torque about the rotational axis can be generated so that in a locking position the balance point of the flap unit is above a horizontal plane in which the rotational axis is located.

* * * * *